A. L. McMURTRY.
WHEEL FOR MOTOR VEHICLES.
APPLICATION FILED DEC. 11, 1906.
904,143.
Patented Nov. 17, 1908.
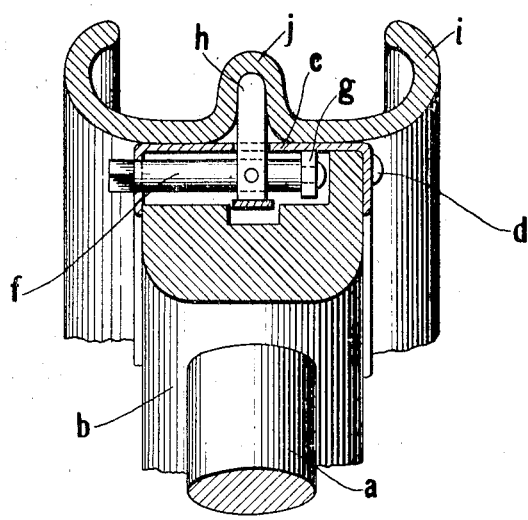
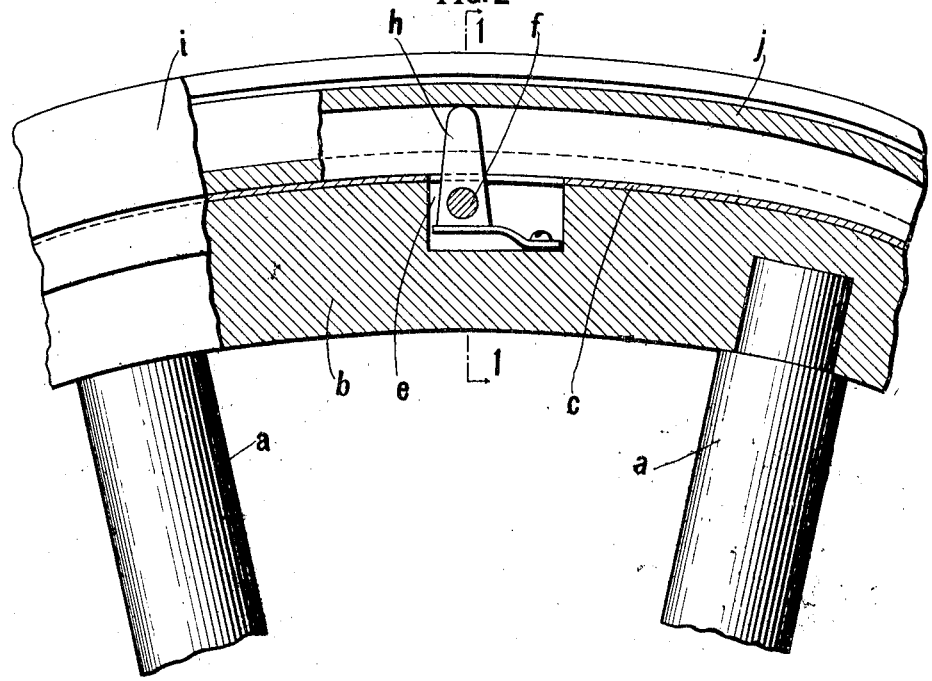
Witnesses
Max B. A. Doring
L. F. Browning.
Inventor
Alden L. McMurtry
By his Attorney
Edward C. Davidson

UNITED STATES PATENT OFFICE.

ALDEN L. McMURTRY, OF NEW YORK, N. Y., ASSIGNOR TO WYCKOFF, CHURCH & PARTRIDGE, A CORPORATION OF NEW YORK.

WHEEL FOR MOTOR-VEHICLES.

No. 904,143.  Specification of Letters Patent.  Patented Nov. 17, 1908.

Application filed December 11, 1906. Serial No. 347,390.

*To all whom it may concern:*

Be it known that I, ALDEN L. MCMURTRY, a citizen of the United States, residing in the borough of Manhattan, city, county, and State of New York, have invented certain Improvements in Wheels for Motor-Vehicles, of which the following is a specification.

This invention relates to a class of wheels having elastic or pneumatic tires carried by a wheel rim that may be removed from the felly or rim base of the wheel, and comprises the new organization hereinafter set forth in detail.

In the accompanying drawings: Figure 1 is a transverse section through the tire and wheel rim on the line 1, 1, of Fig. 2; Fig. 2 is a view partly in elevation and partly in longitudinal section.

$a$ are spokes and $b$ the felly to which is applied a metal tire plate or rim base $c$ flanged at the sides to embrace the sides of the felly and attached thereto by bolts or screws such as $d$. At suitable intervals and between each pair of adjacent spokes if desired, the felly is formed with a recess $e$, within which is arranged a rotating shaft $f$, the outer end of which passes through the flange of the rim base $c$ and is squared for the reception of a suitable key. Its inner end is mounted in a bearing $g$ which may be, and which as shown is, attached to the inner side of the rim base $c$. Keyed to the shaft is a locking arm $h$ which passes radially beyond the circumference of the plate $c$ through an elongated slot in the latter. The removable wheel rim $i$ is integral and continuous and has rolled in it a continuous circumferential corrugation $j$ of considerable height forming in the inner face of the rim a locking channel into which the locking arms $h$ are swung by rotation of the bolts $f$ and in which they fit tightly with frictional contact. The recess $e$ in the felly and the slot in the rim base are so arranged that the locking arms $h$ may be swung to disengage the rim in a direction opposite to that in which the tire will have a tendency to creep; and the creeping tendency of the tire tending to carry the locking plates further in the direction in which they have been swung to engage the rim will cause the arms to abut against the end wall of the slot in the rim base. To prevent the locking arms from being disengaged from the rim by vibration or motion of the wheel, the inner end of the arm may be flat and engaged by a stiff flat spring $k$, the reaction of which tends to hold the arm upright or in radial position.

I claim:

1. A wheel comprising a felly recessed in its outer face, a removable wheel rim formed with a longitudinal locking recess in its inner face, a pivoted rim locking device seated in the recess in the felly and adapted to be moved from a tangential to a radial position to engage the locking channel in the rim.

2. A wheel comprising a felly having a recess in its circumferential face, a continuous integral metal wheel rim having in it a continuous circumferential corrugation forming a locking channel in the inner face of the rim, and a rim locking device seated in the recess in the felly and adapted to be moved outwardly from a tangential position to engage the locking channel in the rim.

3. A wheel comprising a felly recessed in its outer face, a removable wheel rim formed with a longitudinal locking recess in its inner face, a pivoted rim locking device seated in the recess in the felly and adapted to be moved from a tangential to a radial position to engage the locking channel in the rim, and resilient holding means for said locking device.

4. A wheel comprising a felly recessed in its outer face, a removable wheel rim formed with a longitudinal locking recess in its inner face, a pivoted rim locking device seated in the recess in the felly and adapted to be moved radially beyond the circumference of the felly to engage the locking channel in the rim, and resilient holding means for said locking device.

In testimony whereof, I have hereunto subscribed my name.

ALDEN L. McMURTRY.

Witnesses:
L. F. BROWNING,
E. F. WICKS.